May 1, 1962 P. C. GOLDMARK 3,032,612

MAGNETIC RECORDING MEANS

Filed Sept. 25, 1957

INVENTOR
PETER C. GOLDMARK

BY Brumbaugh, Free, Graves & Donohue
ATTORNEYS

United States Patent Office 3,032,612

Patented May 1, 1962

3,032,612
MAGNETIC RECORDING MEANS

Peter C. Goldmark, New York, N.Y., assignor, by mesne assignments, to Minnesota Mining & Manufacturing Company, St. Paul, Minn., a corporation of Delaware Filed Sept. 25, 1957, Ser. No. 686,145
6 Claims. (Cl. 179—100.2)

This invention relates to the recording of intelligence on a moving magnetic medium and more particularly to new and improved magnetic tape recording apparatus which enables a much wider frequency range to be recorded for a given tape speed than has been possible. This invention also has to do with a novel recording method and the magnetic record produced thereby.

While magnetic tape recording apparatus and techniques have been known for some time, tape recordings have not achieved anything like the popularity of disc recordings. Basically, this is due to the fact that in order to achieve the same degree of fidelity as is now common in disc records, relatively high tape speeds are necessary, speeds of 7½"/second and 15"/second being usual. At these speeds, the cost and bulk of the tape required to record given program material is not competitive with the cost of recording the same program material on disc records. While attempts have been made to record at lower tape speeds (i.e., 3¾"/second and 1⅞"/second), these have not been particularly successful because as the speed is lowered, the range of frequencies that can be recorded is reduced, the cutoff frequency at a speed of 1⅞"/second being around 8 kc./second with the best available equipment.

It is an object of the invention, accordingly, to provide a new and improved magnetic tape recording method and apparatus which is free from the above-noted deficiencies of the prior art.

Another object of the invention is to provide a new and improved magnetic tape recording method and apparatus of the above character which is capable of recording a wide range of frequencies at low tape speeds.

A further object of the invention is to provide a new and improved magnetic tape record.

According to the invention, the foregoing objects are attained by disposing aligned recording heads on opposite sides of a magnetic tape, the head adjacent the magnetic tape coating having a very narrow gap as required for recording the higher frequency components of a signal to be recorded and the other head having a wider gap suitable for recording the lower frequency components of the signal. The wider gap head is energized by the lower frequency components of the signal and by high frequency bias of optimum value for recording these frequency components. The narrow gap head is energized by the higher frequency components and also by high frequency bias but in such phase relation as to oppose the high frequency bias field established by the wider gap head, and of such magnitude as to provide in the vicinity of the narrow gap a resultant bias field of optimum value for recording the higher frequency signal components supplied to the narrow gap head. In this fashion, both the low and high frequency components of the signal are efficiently recorded.

The invention will be better understood from the following detailed description of a representative embodiment taken in conjunction with the accompanying drawings, in which.

In order to approximate a straight line recording characteristic in magnetic tape recording, it is accepted practice to superimpose on the signal to be recorded a high frequency A.C. bias. As is well known, there is a critical value of optimum bias for any specific type of recording tape. While this technique is effective, the high frequency A.C. bias even at the optimum value tends to erase the higher audio frequencies.

Figure 1:
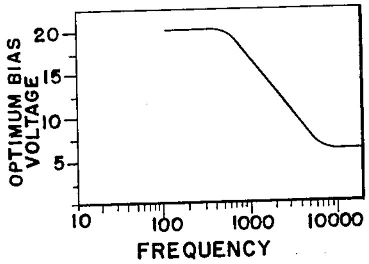
FIG. 1 is a graph illustrating the relation between signal frequency and optimum bias for a typical magnetic tape recorder.

The poor high frequency response characteristic of conventional tape recorders run at low speeds is attributable largely to the fact that the optimum high frequency bias is not a constant but varies as a function of frequency, as shown in FIG. 1. The curve recorded in this figure indicates that for the best conventional polished magnetic tapes the optimum bias value for recording frequencies in the range from about 5,000 to 11,000 cycles/second is about one-third the optimum bias value required for recording lower frequencies in the range from about 100 to 500 cycles/second. For other tapes of poorer quality, a value as low as one-twentieth sometimes obtains. Accordingly, if an optimum bias value is employed which is satisfactory for the lower frequency components of a signal to be recorded, then erasure of the higher frequencies will occur so that frequency distortion is present.

Figure 2:
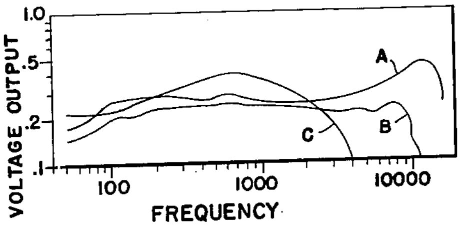
FIG. 2 is a graph illustrating typical response curves of a magnetic tape recorder for three different speeds of operation.

The distortion mentioned above becomes greatly aggravated when the tape recorder is run at successively lower speeds as illustrated by the graphs in FIG. 2. In this figure, the curve A is the response characteristic of a representative magnetic tape recorder operated at a speed of 7½ inches/second, and it is seen to be essentially flat over the range from 50 to 11,000 cycles/second. When the same tape recorder is operated at a speed of 3¾ inches/second, high frequency cutoff occurs at about 10,000 cycles/second as shown by the curve B in FIG. 2, and when the speed is reduced still further to 1⅞ inches/second, high frequency cutoff occurs in the vicinity of 4,000 cycles/second (curve C, FIG. 2). This deterioration in high frequency response is attributable directly to the erasing effect of the high frequency bias, which becomes more pronounced as the tape speed is lowered.

In accordance with the invention, greatly improved high frequency response at low recording speeds is achieved by utilizing two aligned recording heads on opposite sides of the tape, one being supplied only with the low frequency components of a signal to be recorded and high frequency bias having an optimum value for those components and the other receiving only the high frequency components of the signal together with a different bias of optimum value of recording such components.

Figure 3:
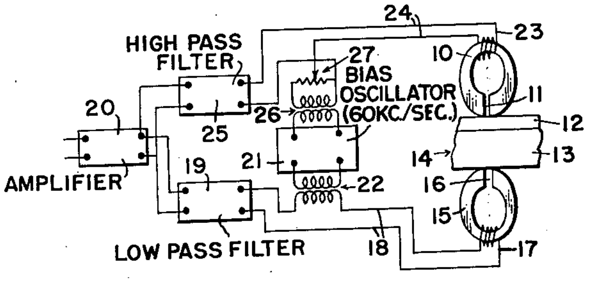
FIG. 3 is a schematic diagram of magnetic tape recorder apparatus constructed according to the invention.

In the typical embodiment shown in FIG. 3, the apparatus comprises a recording head 10 having a gap 11 which may be, say, one to five microns in width as appropriate for recording frequencies up to 15 kc./second at a tape speed of 1⅞ inches/second. The recording head 10 is disposed closely adjacent the surface of the magnetic coating 12 on the base 13 of a conventional magnetic tape 14. On the opposite side of the tape 14 and aligned with the magnetic head 10 is a second magnetic head 15 having a wider gap 16 which may be, say, four to twenty microns in width, as appropriate for recording the lower frequency components of the signal to be recorded.

The recording head 15 is provided with the usual winding 17 which is adapted to receive over the conductors 18 the low frequency components in a signal to be recorded. The conductors 18 are connected to the output of a low pass filter 19 receiving the output of a conventional amplifier 20. The winding 17 also receives high frequency bias at a frequency of, say, 60 kc./second from a bias oscillator 21 through a transformer 22 connected in series with one of the conductors 18. The magnitude of the bias supplied to the winding 17 should be from five to ten times the optimum value that would be used for recording the lower frequency components if the recording head 15 were on the same side of the tape 14 as the head 10 and in engagement with the upper surface of the coating 12, as determined from a characteristic curve like that shown in FIG. 1.

Figure 4:
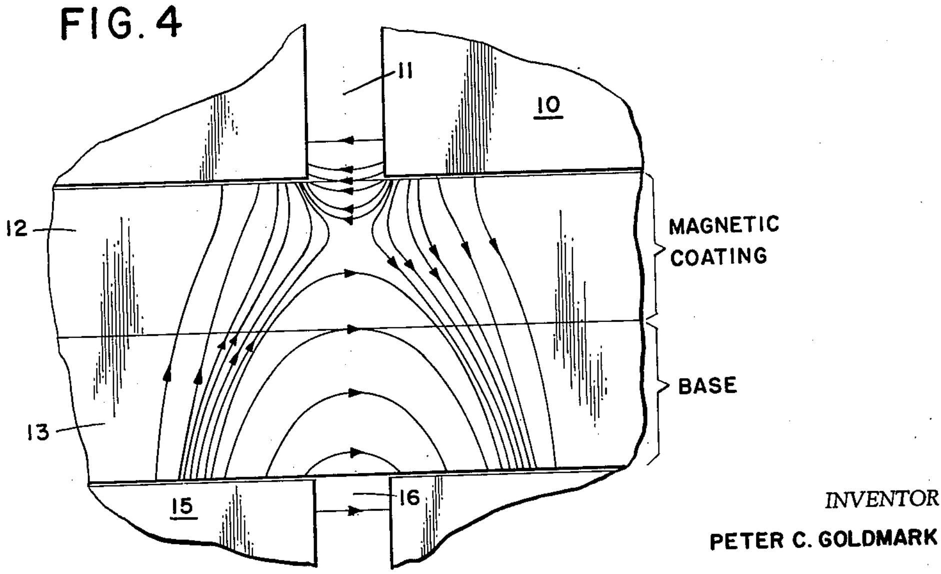
FIG. 4 illustrates a typical magnetic flux pattern for the magnetic heads in FIG. 3.

Similarly, the recording head 10 has a winding 23 which is adapted to receive over the conductors 24 the high frequency components of the signal to be recorded. The conductors 24 are connected to the output of a high pass filter 25 which receives the output of the amplifier 20. The winding 23 also is supplied with high frequency A.C. bias from the bias oscillator 21 through a transformer 26 and a potentiometer 27. However, connections are such that the bias field established by the winding 23 is opposite in phase to the bias field established by the winding 17. Further, the bias field established by the winding 23 is adjusted by means of the potentiometer 27 so that the resultant field in the vicinity of the gap 11 has an optimum value for recording the higher frequency components of the signal supplied to the winding 23. A typical magnetic flux pattern between the recording heads 10 and 15 is shown in FIG. 4.

It will be apparent, therefore, that in the operation of the tape recorder shown schematically in FIG. 3, the higher frequencies will be recorded by the upper recording head 10 on the upper surface of the magnetic coating 12 without substantial erasure by the relatively stronger bias field produced by the lower recording head 15. Further, although the lower recording head 15 is spaced from the coating 12 by the thickness of the tape base 13, the lower frequencies will be successfully recorded in the lower region of the coating 12.

In a practical tape recorder according to the invention, the recording heads 10 and 15 may be similar except for the different gap widths noted above; the tape 14 may be of conventional type having a coating, say, 15 microns thick of iron oxide on a plastic base 13, say, 40 microns thick; the high and low pass filters 25 and 19 may be designed for a crossover frequency of 2,000 to 4,000 cycles/second; and the intensity of the bias signal fed to the winding 17 should be, say, 5 to 10 times the intensity of the bias signal that would be used if the head 15 were on the same side of the tape as the head 10 and in engagement with the coating 12.

The invention thus provides magnetic tape recorder apparatus which is capable of achieving wide frequency response at low tape speeds. By recording the high and low frequency components separately with optimum values of high frequency A.C. bias for each, erasure of the high frequency components by the bias magnetic field at low tape speeds is minimized. Also, the intermodulation distortion is greatly reduced at any tape speed. As a result, magnetic tape recordings competitive with disc records are now entirely feasible.

The specific embodiment described above and illustrated in the drawings is intended to be merely representative and is obviously susceptible of modification in form and detail. The invention, therefore, is not to be limited thereto but is to be regarded as embracing all modifications falling within the scope of the appended claims.

I claim:

1. In magnetic tape recorder apparatus, the combination of a first magnetic recording head having first opposed closely-spaced magnetic poles defining a first gap in a magnetic circuit in inductive relation to a first winding, said first opposed poles having abutting faces separated by said gap and defining one side of a tape transport path, a second magnetic recording head having second opposed closely-spaced magnetic poles defining a second gap in a magnetic circuit in inductive relation to a second winding, said second opposed poles having abutting faces separated by said second gap and spaced from the abutting faces of said first opposed poles so as to define the opposite side of said tape transport path, means for supplying said first and said second windings with different ranges of signal frequencies, and means for supplying said first and second windings with different optimum values of high frequency A.C. bias, respectively, so as to produce in said path biasing magnetic fields of opposite phase, respectively, forming a resultant field having values between said first and second gaps that are appropriate for recording different ranges of signal frequencies, respectively, on a magnetic tape adapted to be positioned in said tape transport path.

2. In magnetic tape recorder apparatus, the combination of a first magnetic recording head having first opposed closely-spaced magnetic poles defining a first gap in a magnetic circuit in inductive relation to a first winding, said first opposed poles having abutting faces separated by said gap and defining one side of a tape transport path, a second magnetic recording head having second opposed closely-spaced magnetic poles defining a second gap in a magnetic circuit in inductive relation to a second winding, said second opposed poles having abutting faces separated by said second gap and spaced from the abutting faces of said first opposed poles so as to define the opposite side of said tape transport path, a first channel of given frequency transmission characteristics connected to said first winding, a second channel of different frequency characteristics connected to said second winding, and means for supplying said first and second windings with different optimum values of high frequency A.C. bias, respectively, so as to produce in said path biasing magnetic fields of opposite phase, respectively, forming a resultant field having values between said first and second gaps that are appropriate for recording different ranges of signal frequencies, respectively, on a magnetic tape adapted to be positioned in said tape transport path.

3. Magnetic tape recorder apparatus as defined in claim 2 in which the widths of said first and second gaps are different and appropriate for recording signal components in frequency ranges corresponding to the frequency transmission characteristics of said first and second channels, respectively.

4. Magnetic tape recorder apparatus as defined in claim 2 in which said first and second channels are adapted to transmit higher and lower signal frequency bands, respectively, in a range of signal frequencies, the width of said first gap is made sufficiently narrow to enable recording of a signal frequency in the upper region of said higher signal frequency band, and the width of said second gap being greater than the width of said first gap.

5. Magnetic tape recorder apparatus as defined in claim 4 in which the high frequency bias is connected to said first winding so as to induce a magnetic bias of one phase in said tape transport path and is connected to said second winding so as to induce in said tape transport path a magnetic bias of opposite phase.

6. In magnetic tape recorder apparatus, the combination of a first magnetic recording head having first opposed closely-spaced magnetic poles defining a first gap in a magnetic circuit in inductive relation to a first winding, the width of said first gap being sufficiently small to enable the recording of a signal frequency in the upper region of a higher signal frequency band in a range of signal frequencies, abutting faces on said first opposed poles separated by said first gap and defining one side of a tape transport path, a second magnetic recording head having second opposed closely-spaced magnetic poles defining a second gap of greater width than said first gap in a magnetic circuit in inductive relation to a second winding, abutting faces on said second opposed poles separated by said second gap and spaced from the abutting faces of said first opposed poles so as to define the opposite side of said tape transport path, a first channel connected to said first winding and having a frequency transmission characteristic corresponding to said higher signal frequency band, a second channel connected to said second winding and having a frequency transmission characteristic corresponding to a lower signal frequency band in said range of signal frequencies, means for supplying to said second winding high frequency A.C. bias of optimum value for recording signal frequencies in said lower frequency band, and means for supplying to said first winding high frequency A.C. bias opposite in phase to the bias supplied to said first winding and of a magnitude such that the resultant bias magnetic field in the vicinity of said first gap has an optimum value for recording signals in said higher signal frequency band.

References Cited in the file of this patent

UNITED STATES PATENTS

| | | |
|---|---|---|
| 2,213,246 | Heller | Sept. 3, 1940 |
| 2,416,279 | Begun | Feb. 25, 1947 |
| 2,484,568 | Howell | Oct. 11, 1949 |
| 2,496,047 | Goddard | Jan. 31, 1950 |
| 2,519,592 | Muller et al. | Aug. 22, 1950 |
| 2,532,917 | Howell | Dec. 5, 1950 |
| 2,547,464 | Hehr | Apr. 3, 1951 |
| 2,628,287 | Haynes | Feb. 10, 1953 |
| 2,629,784 | Daniels | Feb. 24, 1953 |
| 2,685,618 | Rettinger | Aug. 3, 1954 |